(12) United States Patent
Mar

(10) Patent No.: US 11,670,186 B2
(45) Date of Patent: *Jun. 6, 2023

(54) SIMULATION DEVICE

(71) Applicant: Advanced Training System LLC, St. Petersburg, FL (US)

(72) Inventor: Enrique Mar, Fallbrook, CA (US)

(73) Assignee: Advanced Training System LLC, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,088

(22) Filed: Dec. 21, 2021

(65) Prior Publication Data
US 2022/0114908 A1   Apr. 14, 2022

Related U.S. Application Data

(63) Continuation of application No. 15/796,829, filed on Oct. 29, 2017, now Pat. No. 11,244,578, which is a continuation of application No. 14/790,460, filed on Jul. 2, 2015, now Pat. No. 9,852,650.

(51) Int. Cl.
*G09B 9/04* (2006.01)
*G09B 9/05* (2006.01)
*A63G 31/16* (2006.01)

(52) U.S. Cl.
CPC ............. *G09B 9/05* (2013.01); *G09B 9/04* (2013.01); *A63G 31/16* (2013.01)

(58) Field of Classification Search
CPC ............ G09B 9/05; G09B 9/04; A63G 31/16
USPC ........................................................ 434/62
See application file for complete search history.

(56) References Cited

U.S. PATENT DOCUMENTS

| 2,710,783 | A | 6/1955 | Chaft |
| 3,577,659 | A | 5/1971 | Kail |
| 4,276,030 | A | 6/1981 | Radice |
| 4,402,546 | A | 9/1983 | Johnson |
| 4,678,197 | A | 7/1987 | Stein |
| 5,433,670 | A | 7/1995 | Trumbull |
| 5,489,212 | A | 2/1996 | Yoshimoto |
| 5,527,184 | A | 6/1996 | Trumbull |
| 5,685,718 | A | 11/1997 | McClintic |
| 6,354,838 | B1 | 3/2002 | Tagge |
| 7,094,157 | B2 | 8/2006 | Fromyer |
| 7,717,798 | B2 | 5/2010 | Bellows |

(Continued)

FOREIGN PATENT DOCUMENTS

WO   WO2013011143   1/2013

*Primary Examiner* — Michael C Grant
(74) *Attorney, Agent, or Firm* — Larson & Larson, P.A.; Frank Liebenow; Justin P. Miller

(57) ABSTRACT

A simulation device includes an outer frame and an inner frame. The outer frame is fixed to a floor surface and the inner frame is slideably interfaced to the outer frame. The inner frame has an inner frame axis. A hydraulic cylinder is interfaced between the outer frame and the inner frame. Operation of the hydraulic cylinder slides the inner frame with respect to the outer frame along the inner frame axis. A yaw platform is interfaced to the inner frame at one end at a pivot and at a distal opposing end by two or more bearings. The yaw platform has a yaw platform axis. Operation of a yaw motor or a yaw hydraulic ram interfaced between the yaw platform and the inner frame causes the yaw platform to change an angle between the inner frame axis and the yaw platform axis, providing simulation of yaw (loss of control).

20 Claims, 14 Drawing Sheets

(56) References Cited

U.S. PATENT DOCUMENTS

| | | |
|---|---|---|
| 7,867,149 B1 | 1/2011 | Webber |
| 8,287,394 B2 | 10/2012 | Gil |
| 8,827,709 B1 | 9/2014 | Gurule |
| 9,396,667 B1 | 7/2016 | Bober |
| 2003/0027692 A1 | 2/2003 | Phillips |
| 2005/0146185 A1 | 7/2005 | Fookes |
| 2007/0228794 A1 | 10/2007 | Penley |
| 2012/0052477 A1 | 3/2012 | Scolari |
| 2014/0093861 A1 | 4/2014 | Scolari |
| 2016/0310853 A1 | 10/2016 | Chiang |
| 2017/0326412 A1 | 11/2017 | Scholl |
| 2020/0009996 A1 | 1/2020 | Brodersen |

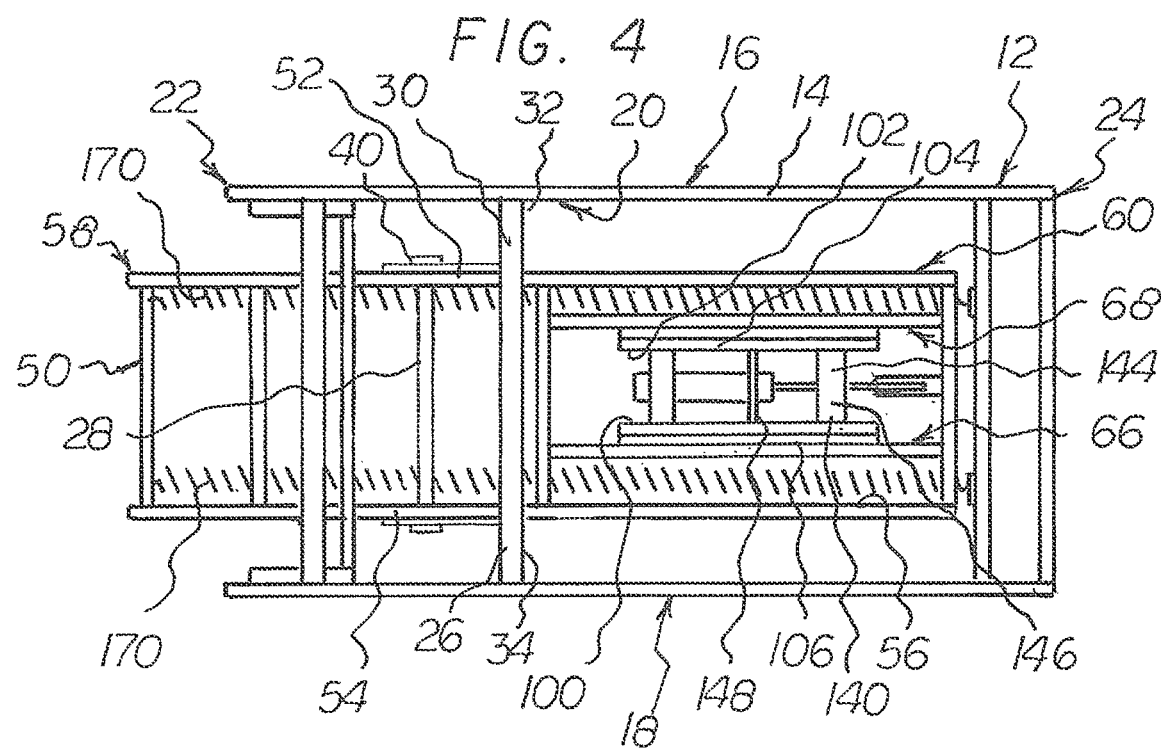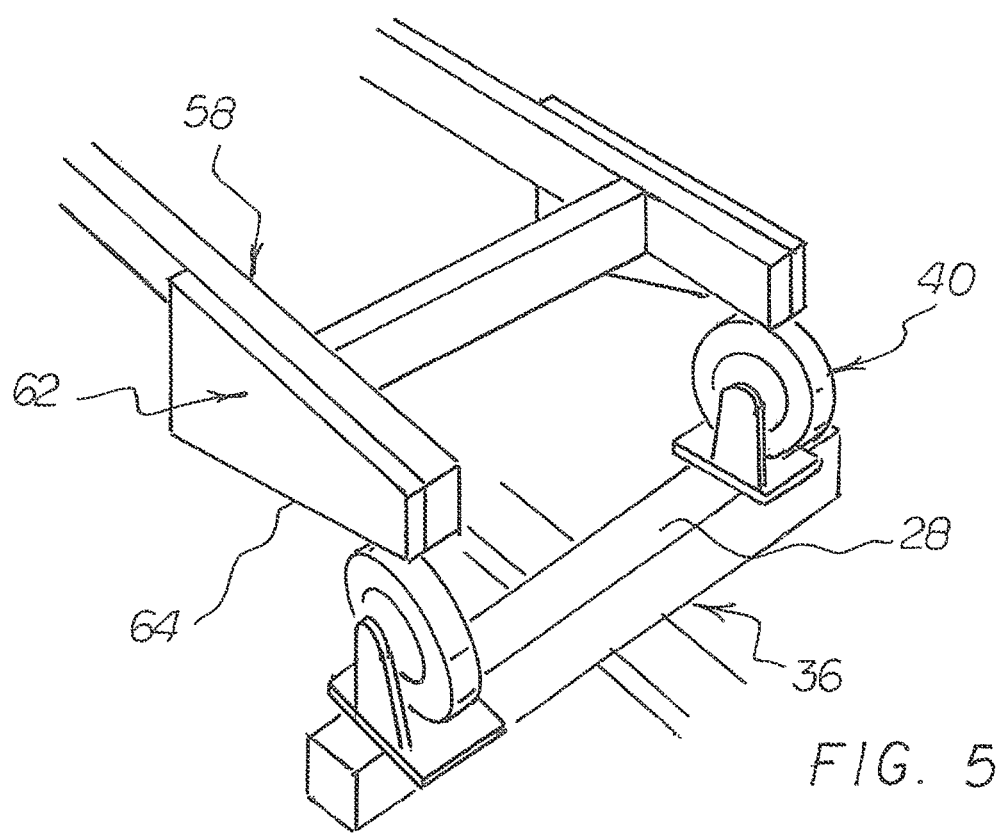

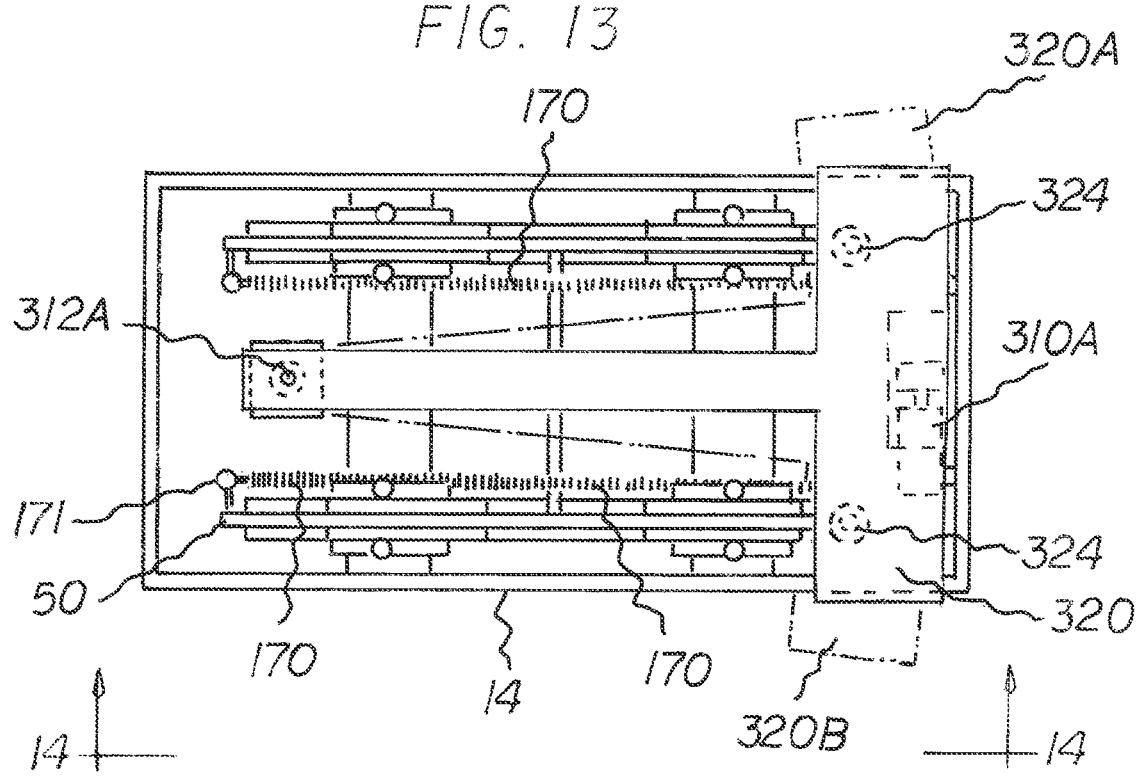
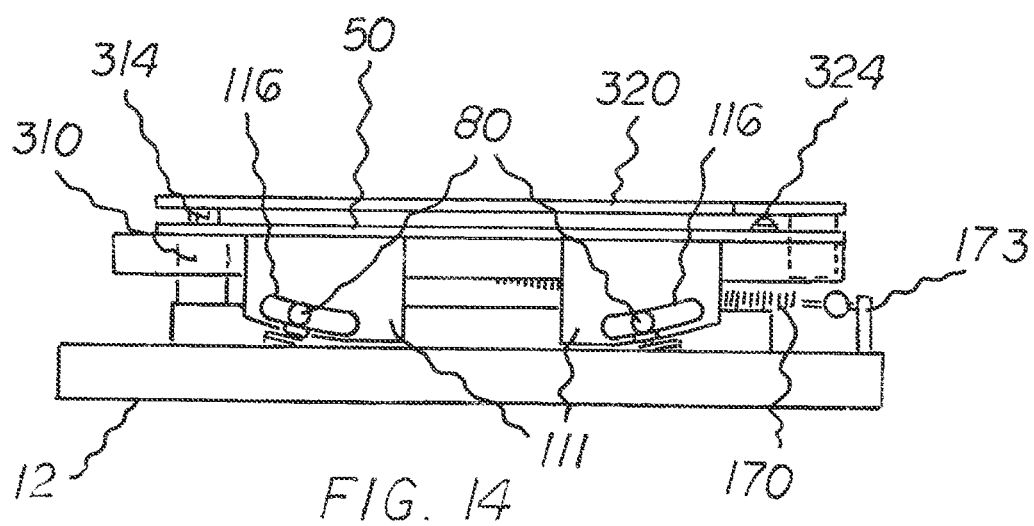

FIG. 21
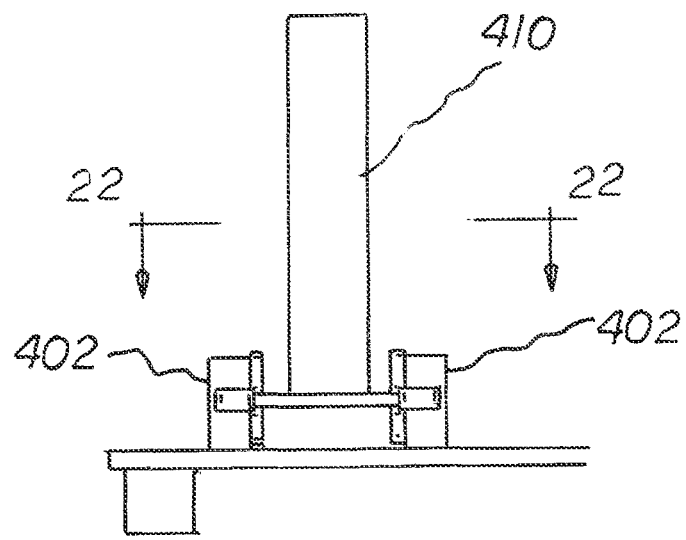
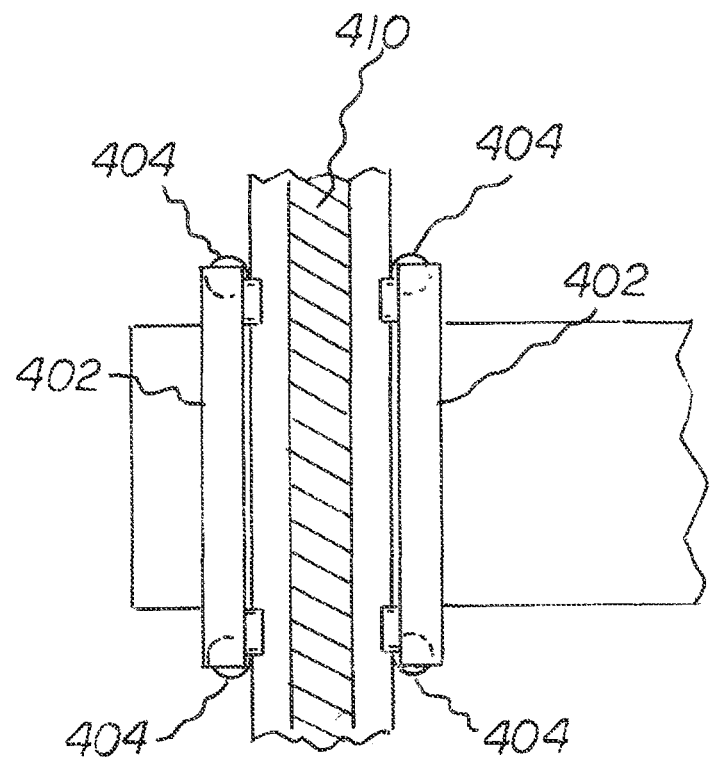
FIG. 22

SIMULATION DEVICE

CROSS-REFERENCE TO RELATED APPLICATION

This application is a continuation of U.S. patent application Ser. No. 15/796,829 filed Oct. 29, 2017, which is a continuation-in-part of U.S. patent application Ser. No. 14/790,460, filed Jul. 2, 2015 issued as U.S. Pat. No. 9,852,650 on Dec. 26, 2017, the disclosure of which is hereby incorporated by reference.

FIELD

This invention relates to the field of simulation devices and more particularly to a device for providing simulated driving training.

BACKGROUND

The use of training simulators is known in the prior art. More specifically, training simulators previously were devised and utilized for the purpose of using a stationary system to teach skills for managing a moving vehicle.

While the prior art devices fulfill their respective, particular objectives and requirements, the prior art does not describe simulation device that allows a device for providing simulated driving training having motion sensations that mimic those found in real-life driving situations. For example, when decelerating, the front of a real vehicle angles downward, closer to the road surface while when accelerating, the front of a real vehicle angles upward, farther from the road surface. Existing simulation systems do not adjust an angle the vehicle cab in which the trainee sits during the simulation.

In another example, the simulation systems of the prior art have abilities to present a scenario where the vehicle is out of control, as might be encountered in snow, or icy conditions, but the trainee using the simulator has not feeling of being out of control as such simulation systems do not provide proper movement sensory input that stimulates the trainee's sense of balance or equilibrioception. Although prior systems simulate a minor degree of movement through actuators, the slow response of such systems and the lack of proper directional actuation do not provide proper stimulation of the trainee's inner ear; which results in confusing signals to the trainee's brain.

Another example of the shortfalls of prior simulation systems is in training of law enforcement personnel. In such, the trainee (officer) must learn how to tap the rear-end of a speeding criminal's vehicle with the front end of their squad car. The goal is to cause the criminal to lose control while the officer retains control of his or her squad car. Much of the learning to perform this task relies on learning to feel what happens when this operation is performed correctly and, likewise, when performed incorrectly. Without proper sensory input, the trainee will not be trained in performing this task and, when called upon to stop a speeding criminal, the trainee will be risking their own safety.

What is needed is a simulation system that not only provides visual and tactile stimulus to the trainee, the simulation system also provides proper motion stimulation to the trainee's inner ear.

SUMMARY

In one embodiment, a simulation device is disclosed including a outer frame and an inner frame. The outer frame is fixed to a floor surface and the inner frame is slideably interfaced to the outer frame. The inner frame has an inner frame axis. A hydraulic cylinder is interfaced between the outer frame and the inner frame. The hydraulic cylinder is interfaced to slide the inner frame with respect to the outer frame. A yaw platform is interfaced to the inner frame at one end at a pivot and at a distal opposing end by two or more bearings. The yaw platform has a yaw platform axis. Operation of a yaw motor or a yaw hydraulic ram interfaced between the yaw platform and the inner frame causes the yaw platform to change an angle between the inner frame axis and the yaw platform axis.

In another embodiment, a method of providing a simulation of yaw in a simulation system is disclosed including moving a payload forward and backward along an axis of movement to simulate acceleration and deceleration and rotating the payload with respect to the axis of movement to simulate yaw.

In another embodiment, a simulation device is disclosed including a outer frame, the outer frame being fixed to a floor surface and an inner frame that is slideably interfaced to the outer frame. The inner frame has an inner frame axis. A hydraulic cylinder is interfaced between the outer frame and the inner frame so that extending of the hydraulic cylinder slides the inner frame in a first direction along the inner frame axis and retracting of the hydraulic cylinder slides the inner frame in a second, opposing direction along the inner frame axis. A yaw platform is interfaced to the inner frame at one end by a pivot, a distal, opposing end of the yaw platform is slideably interfaced to the inner frame thereby the distal, opposing end of the yaw platform is slideable in an arc having a radius emanating from the pivot. The yaw platform having a yaw platform axis. A payload is connected to a top surface of the yaw platform, the payload comprising a seat. A yaw motor is interfaced to the yaw platform to cause the yaw platform to slide in the arc, thereby an angle between the inner frame axis and the yaw platform axis changes.

BRIEF DESCRIPTION OF THE DRAWINGS

The invention can be best understood by those having ordinary skill in the art by reference to the following detailed description when considered in conjunction with the accompanying drawings in which:

FIG. 4 is a bottom plan view of the outer and inner frames and the components of the frames. The view shows the relationship of the frames to each other.

FIG. 5 is a close-up view of the inner frame bevels rising on the outer frame bevel rollers.

FIG. 13 is a top plan view of the inner frame including yaw motion mechanisms.

FIG. 14 is a side view of the inner frame and outer frame including yaw motion mechanisms.

FIG. 21 is a detail view of the simulation device within circle 21 of FIG. 20 having the slide mechanism.

FIG. 22 is a second detail view of the simulation device having the slide mechanism.

DETAILED DESCRIPTION

Figure 1:
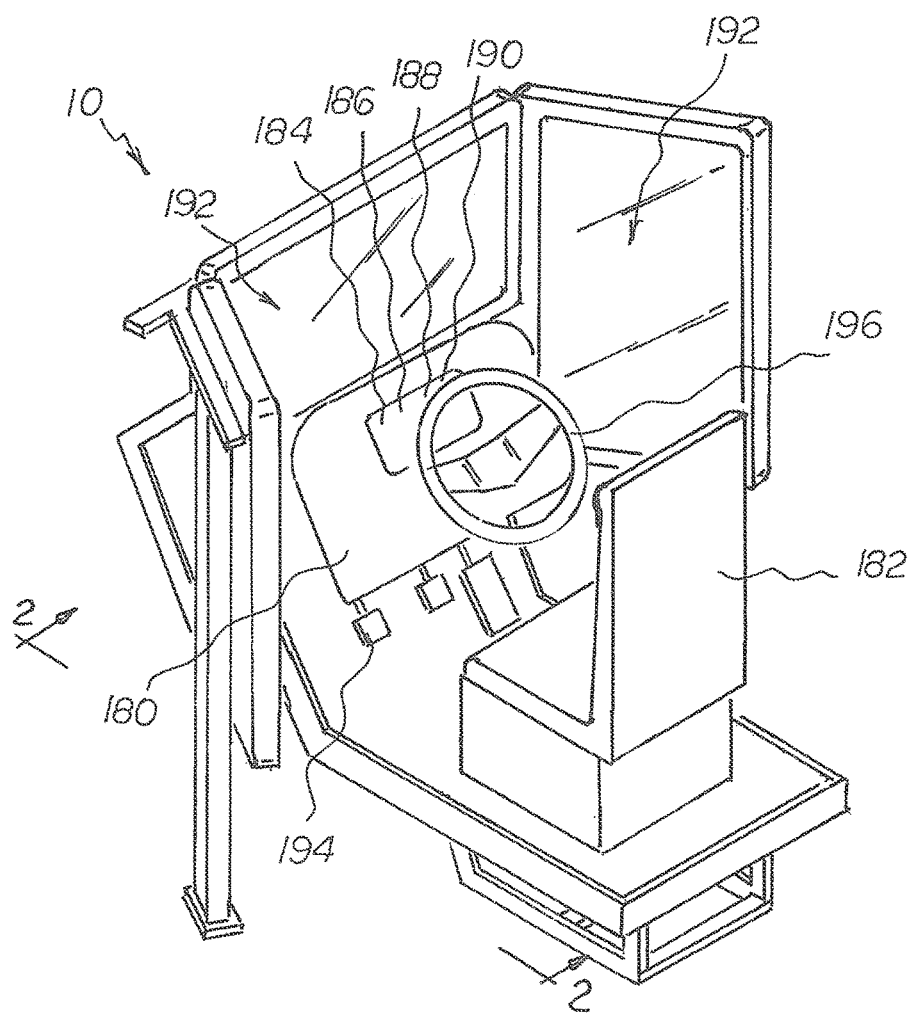
FIG. 1 is a perspective view of the device as presented to a user, showing the seat, viewing screens, and controls.
Figure 2:
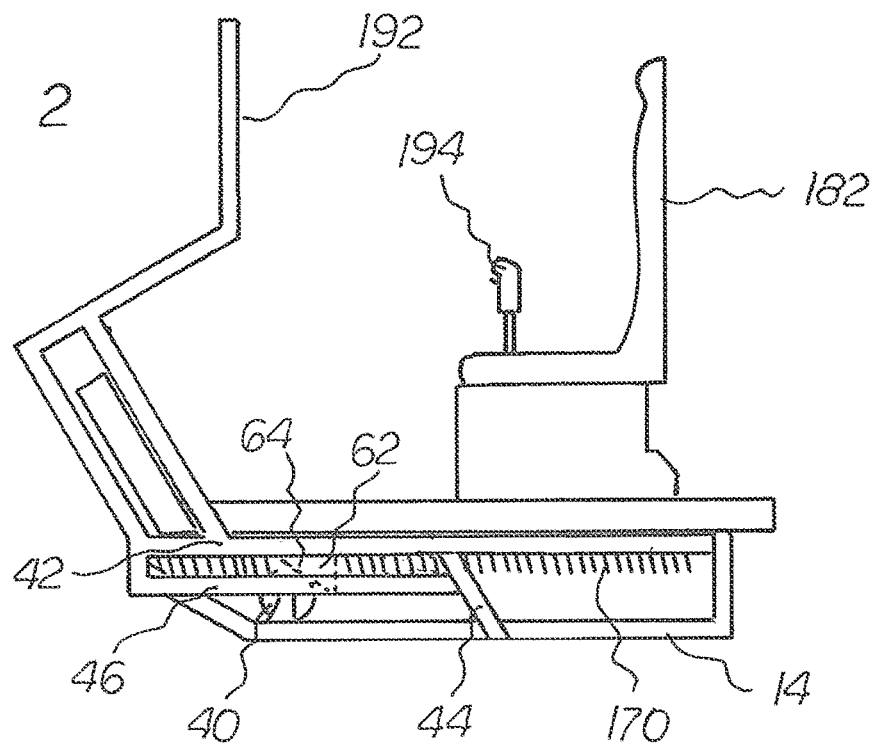
FIG. 2 is a view taken along line 2-2 of FIG. 1.
Figure 3:
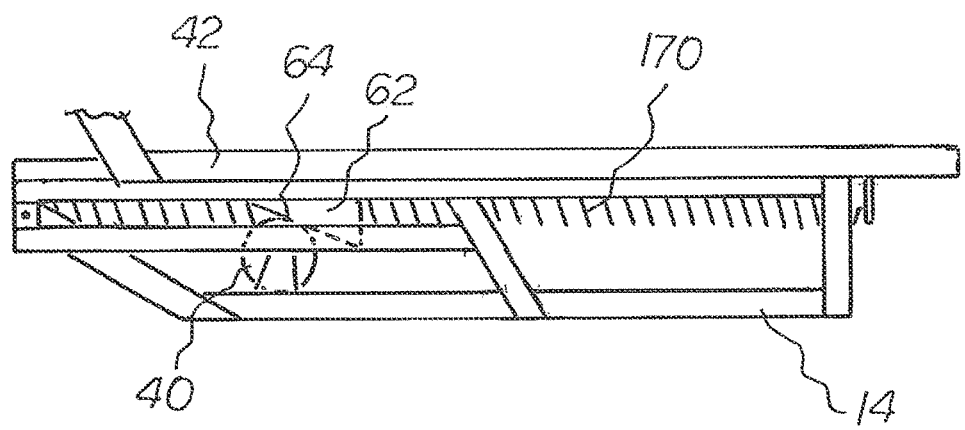
FIG. 3 is a close up side view of the lower portion of FIG. 2, showing the outer frame and inertia balancing spring, as well as the bevel and bevel roller.
Figure 6:
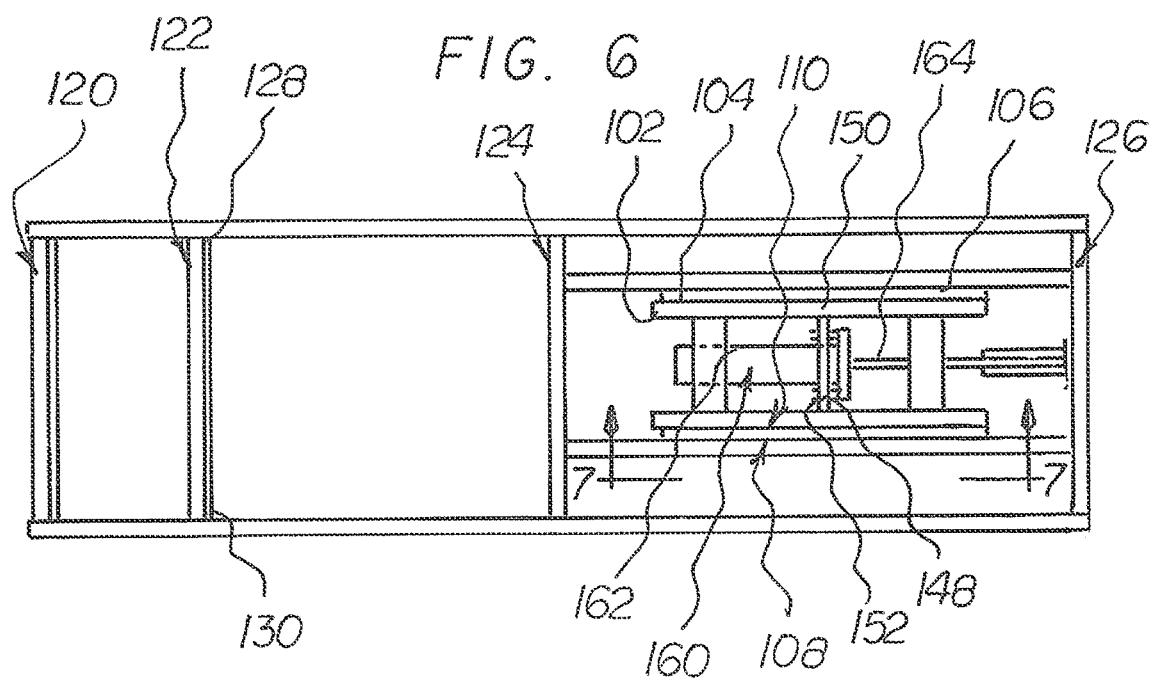
FIG. 6 is a top plan view of the inner frame.
Figure 7:
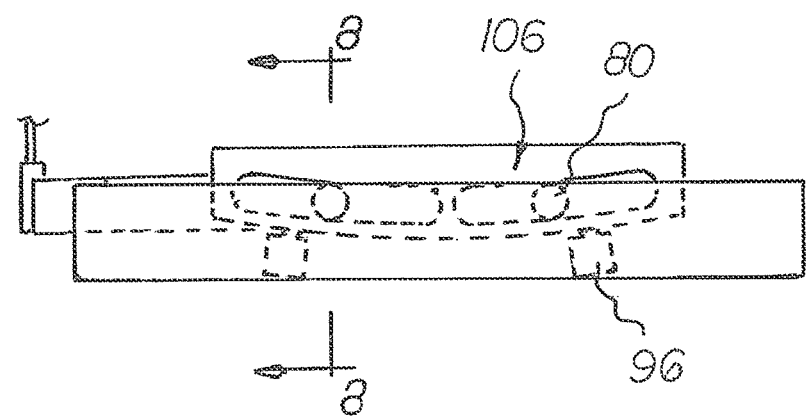
FIG. 7 is a view taken along line 7-7 of FIG. 6.
Figure 8:
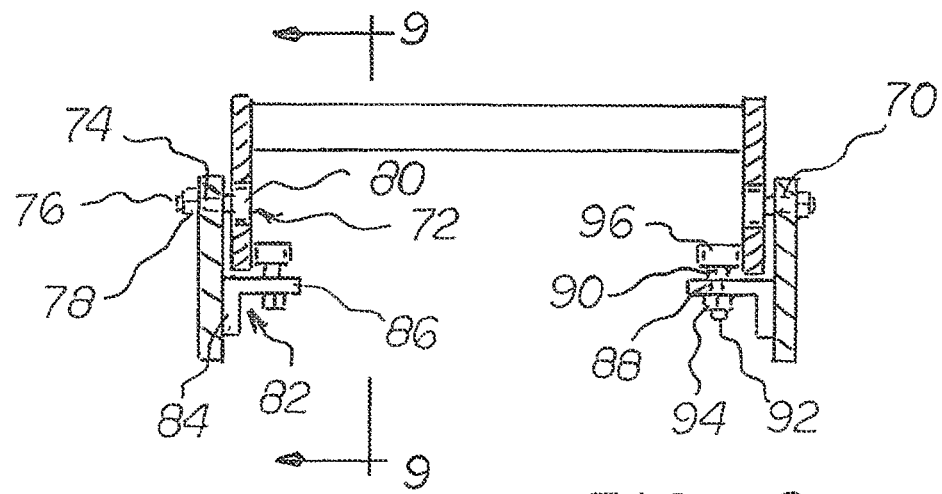
FIG. 8 is a view taken along line 8-8 of FIG. 7.
Figure 9:
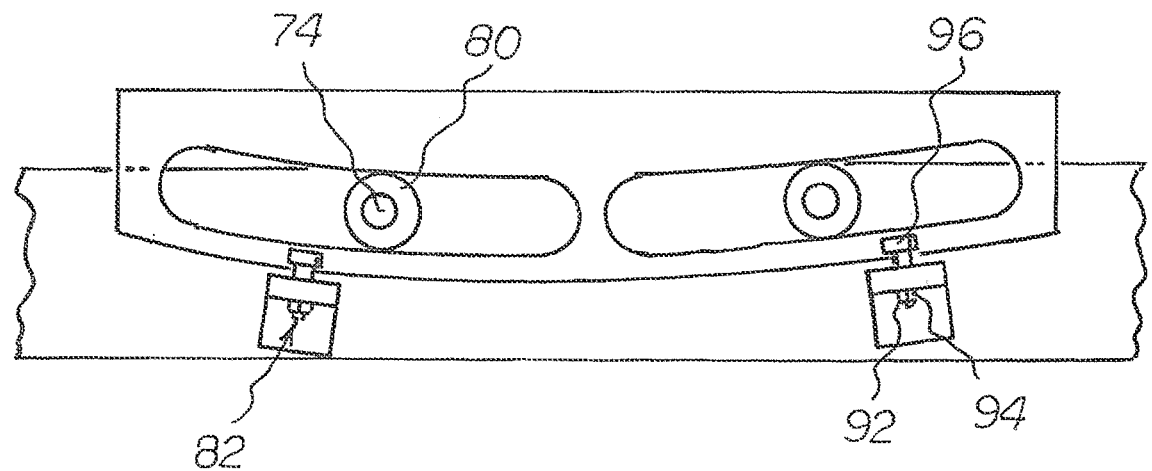
FIG. 9 is a view taken along line 9-9 of FIG. 8.
Figure 10:
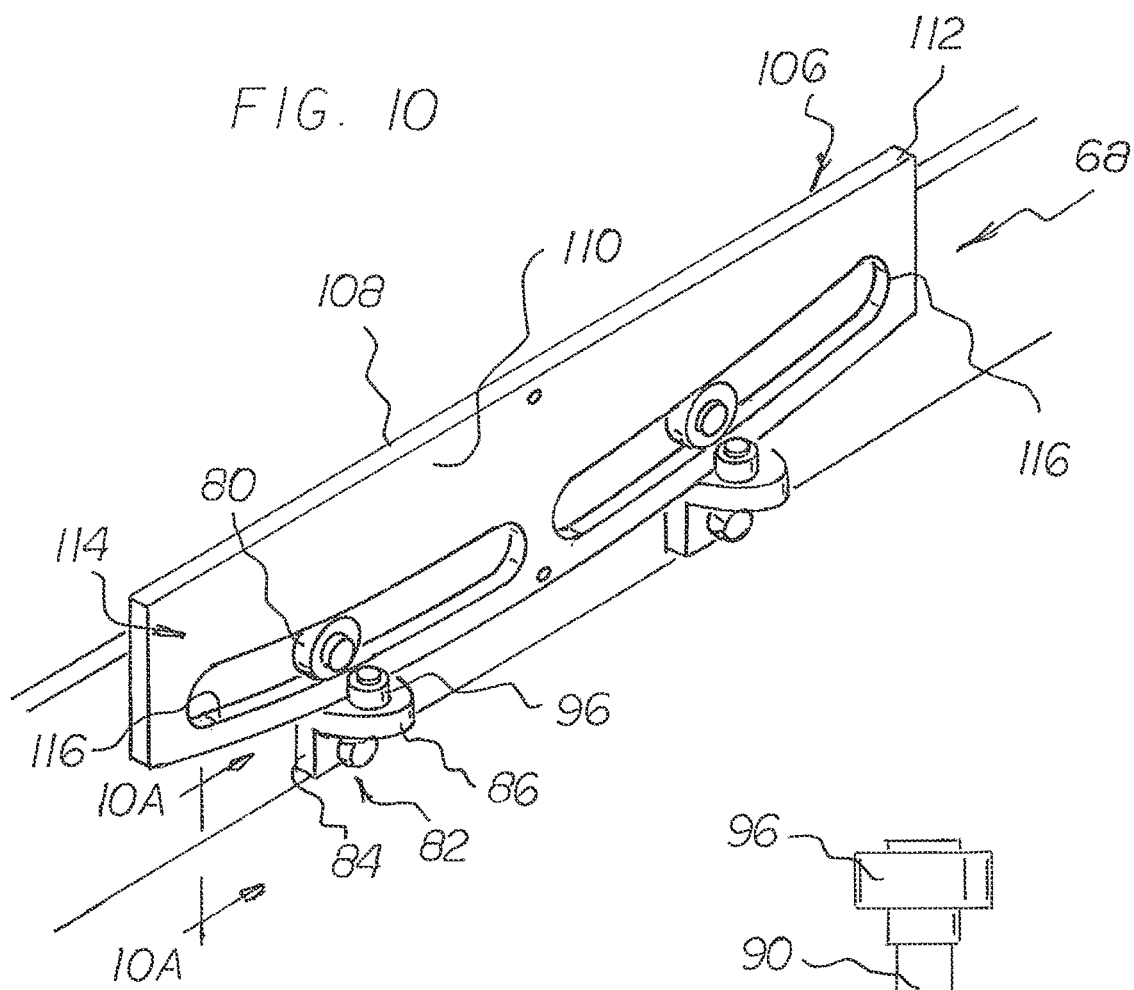
FIGS. 10, 10A, and 10B are perspective views of the arcuate plate located on the inside of the inner frame support rail. Note how the vertical rollers of the horizontal roller subassembly engage the slots of the arcuate plate. Note, also, the horizontal rollers of the vertical roller subassembly riding on the inner surface of the arcuate plate, keeping the plate in position.
Figure 10A:
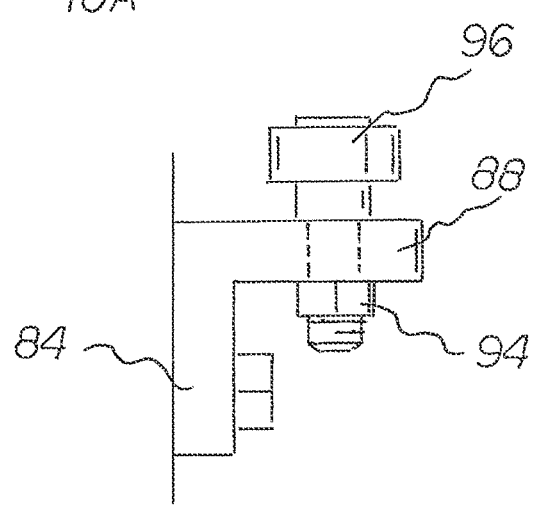
Figure 10B:
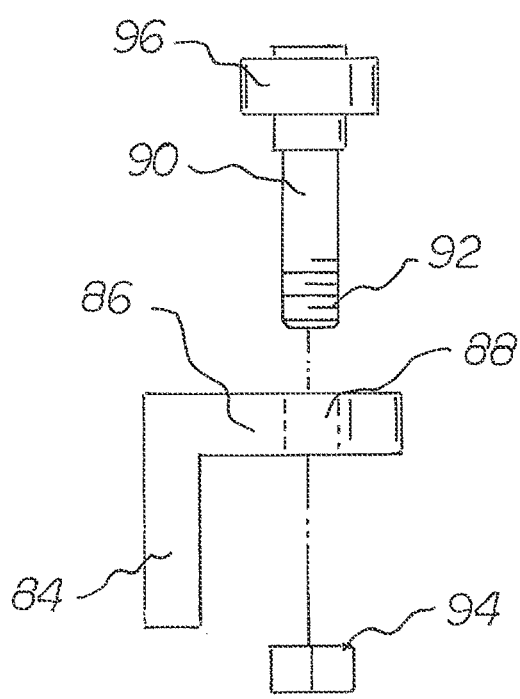
Figure 11:
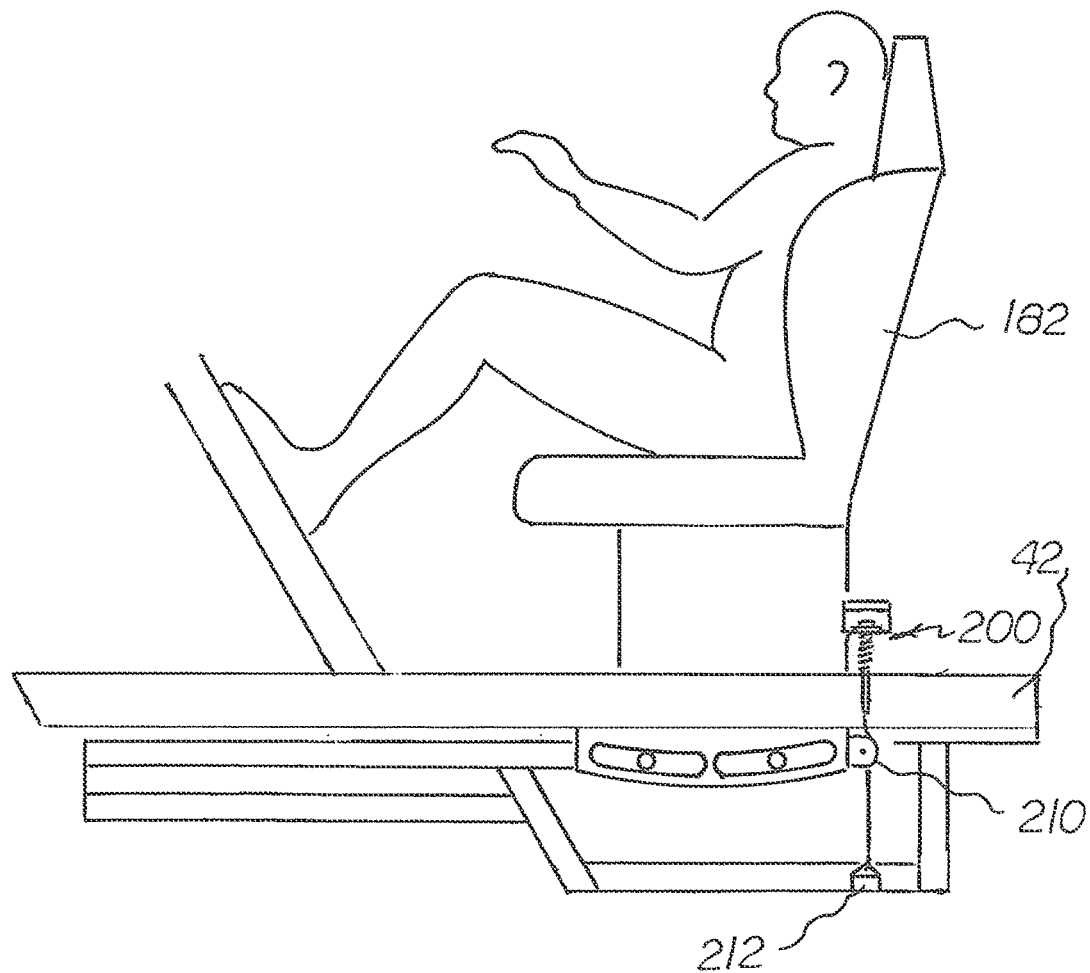
FIG. 11 is a side elevational view showing the user in position in the seat, with the seat belt subassembly in place, with the arcuate plate in a neutral orientation.
Figure 12:
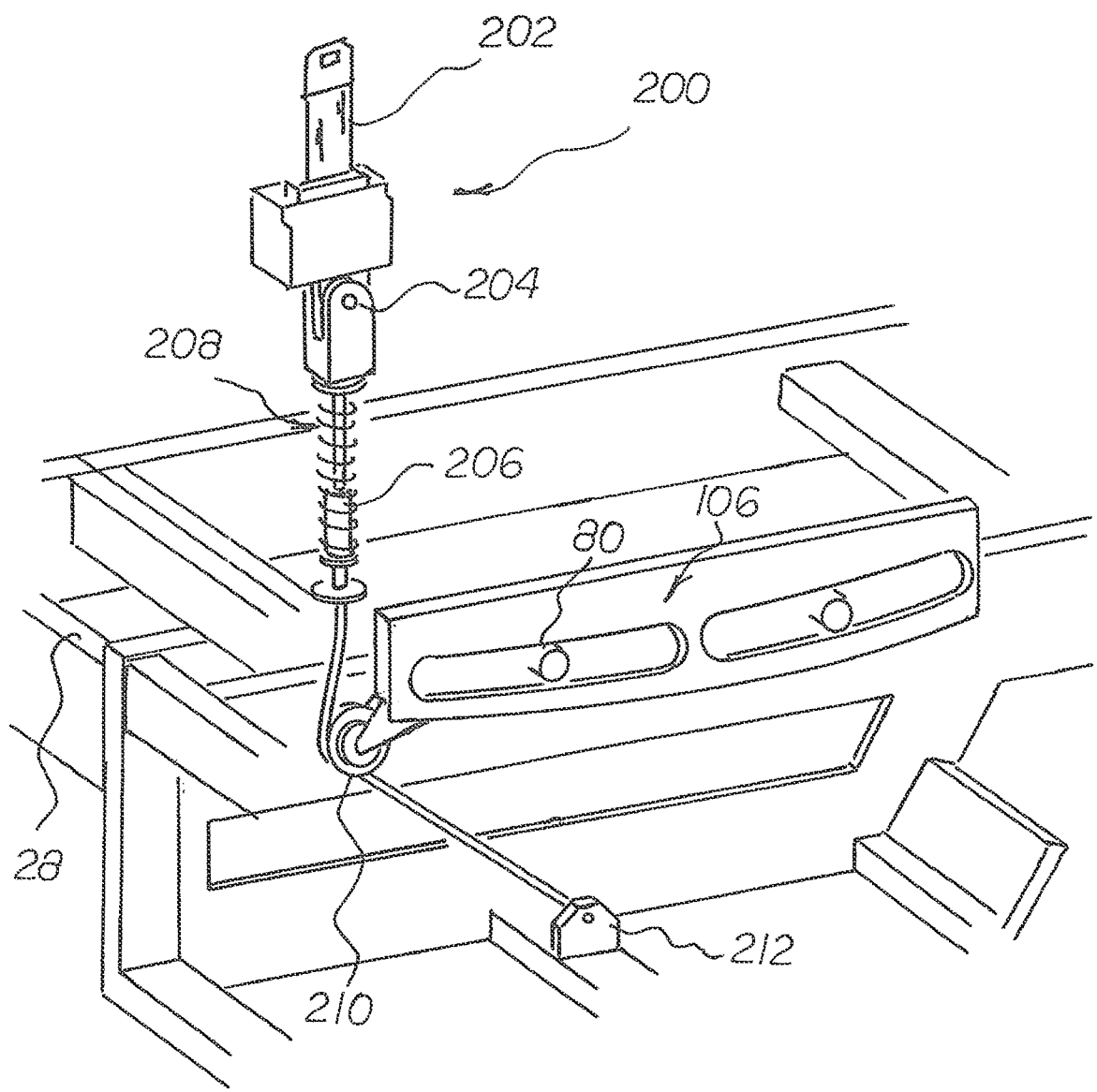
FIG. 12 is a close-up view of the arcuate plate and seat belt subassembly. As the arcuate plate moves forward, simulating acceleration of vehicle, the user would be rocked back, and the belt would loosen. Alternately, if the arcuate plate is moved rearward, the user's seat pitches forward, simulating braking, and the belt would then tighten, to provide the physical cue that braking is occurring.
Figure 15:
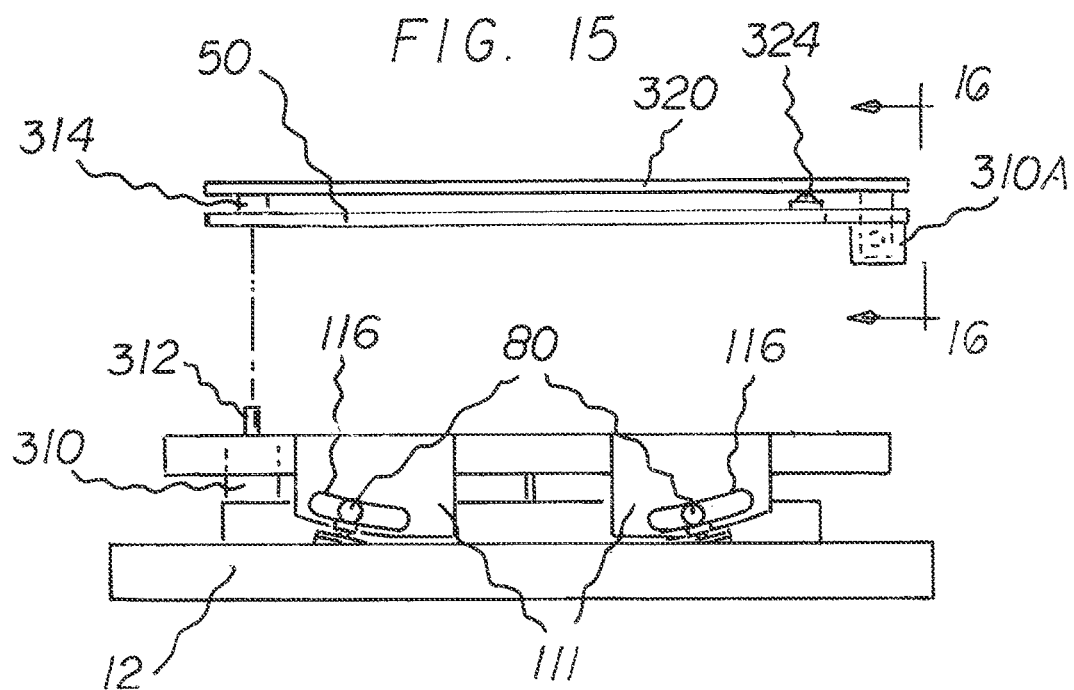
FIG. 15 is a side exploded view of the inner frame and outer frame including yaw motion mechanisms.
Figure 16:
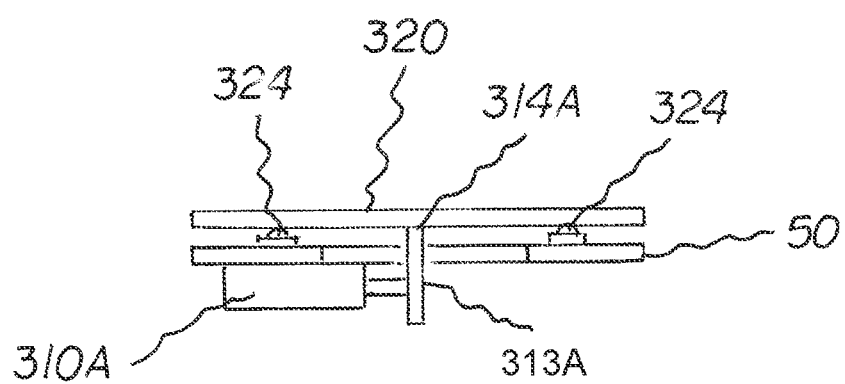
FIG. 16 is a front side view of the inner frame and outer frame including yaw motion mechanisms.

Reference will now be made in detail to the presently preferred embodiments of the invention, examples of which are illustrated in the accompanying drawings. Throughout the following detailed description, the same reference numerals refer to the same elements in all figures.

The middle ear, coupled with sight, help human beings maintain balance and provide human beings with a sense of location. The balancing organs of the inner ear comprise fluid-filled tubes having nerve sensors that determine movement and rotation in all directions. When driving in a vehicle, the middle ear senses directional movement and changes. When decelerating, the front of a real vehicle angles downward, closer to the road surface while when accelerating, the front of a real vehicle angles upward, farther from the road surface. When driving on a slippery roadway or when losing control of the vehicle, the middle ear detects yaw of the vehicle. Yaw is rotational movement around a yaw axis. In effect, yaw is a change in the direction that the vehicle is pointing. For example, when the vehicle runs into black ice, the vehicle continues to travel predominately in the same direction, yet the vehicle points to the left or to the right of this direction of motion, as in a swerve or a skid.

With reference now to the drawings, and in particular to FIGS. 1-11 thereof, an embodiment of the simulation device embodying the principles and concepts of the present invention and generally designated by the reference numeral 10 will be described. Note that for clarity purposes, an inner frame 50 and outer frame 12 are described as in the embodiments shown in the figures, though there is no restriction on the spatial relationships to each frame, nor which frame is anchored to a surface/floor.

The present invention, the simulation device 10 is comprised of a plurality of components. Such components in their broadest context include an outer frame, an inner frame slidably mounted on the outer frame, a control and a hydraulic cylinder 160 operated by the control, so as to simulate movement, both acceleration and deceleration by moving the inner frame with respect to the outer frame. As will be shown, although the movement is typically caused by a hydraulic cylinder 160, there is one or more balancing springs 170 that are adjusted based upon a payload (e.g., cab as shown in FIG. 1 and a trainee that is not shown). In such, the balancing springs 170 are adjusted/loaded to achieve as much balance as possible, considering the mass of the trainee. In this way, the hydraulic cylinder 160 is able to provide the fastest possible movement of the payload to simulate acceleration and deceleration. Further, through the use of the unique interface between the inner frame 50 and the outer frame 12 utilizing vertically oriented rollers 80 that ride in a pair of arcuate slots 116, the inner frame 50 changes angle with respect to the outer frame 12 as acceleration and deceleration is simulated, thereby providing a more realistic feel during simulation. Such components are individually configured and correlated with respect to each other so as to attain the desired objective.

Note that, throughout this description a particular embodiment of the invention is shown as an example and such has been successfully tested, though it is fully anticipated that other physical embodiments will achieve similar results utilizing different components.

A simulator device 10 is described. There is first an outer frame 12. The outer frame comprises a pair of generally mirror image rectilinear shaped outer frame lower rails 14. The lower rails being a right outer frame lower rail 16 and a left outer frame lower rail 18. Each of the outer frame lower rails has an inner surface 20, an outer surface, a upper surface, a bottom surface, a forward end 22, and a rearward end 24, with a length there between. The outer frame lower rails are oriented to be generally parallel with each other.

There is a plurality of outer frame lower rail cross members 26. The outer frame lower rail cross members couple the right lower rail and the left lower rail. Each of the outer frame lower rail cross members has an inner surface, a upper surface 28, a bottom surface 30, and a rearward surface. Each outer frame lower rail cross member has a right end 32 and a left end 34, with a length there between.

The plurality of outer frame lower rail cross members comprise a forward cross member, an inner forward cross member 36, an inner rearward cross member, and a rearward cross member.

The lower rail inner forward cross member of the outer frame has a pair of bevel roller wheels 40 coupled to the upper surface of the outer frame lower rail inner forward cross member.

In a variation, each cross member may run from outer frame lower rail to outer frame lower rail. In the preferred embodiment the lower rail inner forward cross member is not attached to the outer frame lower rail.

There is a pair of generally mirror image rectilinear shaped outer frame upper rails, being a right outer frame upper rail and a left outer frame upper rail 42. Each of the outer frame upper rails has an inner surface, an outer surface, and a upper surface, a bottom surface, a forward end, and a rearward end, with a length there between.

The outer frame lower rails and the outer frame upper rails are coupled to each other.

There are a plurality of right outer frame riser rails coupling the right upper outer frame rail to the right lower outer frame rail. The right outer frame riser rails are a right forward outer frame riser, a right middle outer frame riser, and a right rearward outer frame riser.

There is a plurality of left outer frame riser rails 44 coupling the left outer frame upper rail to the left outer frame lower rail. The left outer frame riser rails are a left forward outer frame riser and a left middle outer frame riser and a left rearward outer frame riser.

The outer frame also comprises a pair of generally mirror image rectilinear shaped outer frame middle horizontal rails, being an outer frame right middle horizontal rail and an outer frame left horizontal rail 46. Each outer frame middle horizontal rail has an upper surface, a lower surface, and a pair of generally parallel side surfaces, as well as a forward end and a rearward end, with a length there between. The outer frame lower rails are generally parallel with each other.

There is also an inner frame 50. The inner frame comprises several components, in combination.

There is a pair of generally mirror image rectilinear shaped inner frame outer rails 52, being a right inner frame outer rail 52 and a left inner frame outer rail 54. Each of the inner frame outer rails has an inner surface 56, an outer surface, a upper surface, a bottom surface, a forward end 58, and a rearward end 60, with a length there between. The inner frame outer rails are configured to be generally parallel with each other.

The forward end of each of the inner frame outer rails has a downwardly disposed bevel projection 62. Each bevel projection has a lower edge 64. The lower edge of each of the downwardly disposed bevel projections of the inner frame outer rails rides on each of the bevel roller wheels of the lower rail inner forward cross member of the outer frame.

There is a pair of inner frame support rails 66. Each of the inner frame support rails has a generally mirror image configuration. The inner frame support rails each are a generally mirror image of each other. The inner frame support rails each have an upper surface, a bottom surface, an inner surface 68, an outer surface, a forward end, and a rearward end, with a length there between. Each of the inner frame support rails is located adjacent the inner surface of each of the inner frame outer rails.

Each of the pair of inner frame support rails has a plurality of horizontally oriented arcuate roller subassembly mount holes 70 there through. Each of the horizontally oriented arcuate roller subassembly mount holes of the inner frame support rails has an associated horizontally oriented arcuate roller subassembly 72 coupled thereto. Each horizontally oriented arcuate roller subassembly has a horizontally oriented stepped central shaft 74 having a male threaded end 76, and an associated nut 78. Each horizontally oriented arcuate roller subassembly has a vertically oriented roller 80.

The inner surface of each of the inner frame support rails has an L-shaped roller subassembly mount 82. Each of the L-shaped roller subassembly mounts of the inner frame support rails has a generally downwardly disposed outer leg 84 and a horizontally disposed inner leg 86. The horizontally disposed inner leg has a roller shaft hole 88 there through.

Each of the horizontally oriented roller subassembly mounts has an associated vertically oriented roller subassembly. Each inner frame support rail vertically oriented roller subassembly has a stepped vertically oriented central roller shaft 90. Each vertically oriented roller shaft of the vertically oriented roller subassembly has a male threaded end and an associated nut 94. The vertically oriented central shaft of each vertically oriented roller subassembly being configured to be received by and mate with the roller shaft hole of the horizontally disposed inner leg of the roller mount. The inner frame support rails are generally parallel with each other. Each vertically oriented roller subassembly has a horizontally oriented roller 96.

There is a pair of inner frame inner rails 100. The inner frame inner rails each are a generally mirror image of each other. The inner frame inner rails each have an upper surface, a bottom surface, an inner surface 102, an outer surface 104, a forward end, and a rearward end, with a length there between. Each of the inner frame inner rails is located adjacent the inner surface of each of the inner support rails.

The rearward end of inner surface of each of the inner frame inner rails has an arcuate slot plate 106 attached thereto. Each arcuate slot plate 111 has an upper surface, a bottom surface, and a pair of parallel side surfaces, being an outer surface 108 and an inner surface 110. Each arcuate slot plate 111 has a forward end 112 and a rearward end 114, with a length there between. Each arcuate slot plate has a pair of arcuate slots 116 there through. Each arcuate slot running from the inner surface of the arcuate slot plate 111 to the outer surface of the arcuate slot plate 111, there through.

The arcuate slot plates are located between the inner frame inner rail and the inner frame support rail. The arcuate slot plates 111 allow for movement of the inner frame inner rails relative to the inner frame support rails.

The slots are configured to allow a forward and rearward tilt of the arcuate slot plate 111 in an amount of between about four degrees and fifteen degrees. In the preferred embodiment, the tilt which is achieved in the forward or rearward direction is approximately six degrees. The six-degree tilt is that amount of tilt which is easily perceivable and gives a user who is riding on the arcuate slot plate 111 a perception of leaning forward or rearward, as would be perceived in deceleration or acceleration of a vehicle under controlled circumstances.

The arcuate slots of the arcuate slot plates 111 are configured to movably receive and mate with each of the vertically oriented rollers of the horizontally oriented roller subassemblies, so as to produce a rocking effect as the arcuate slot plate 111 moves relative to the vertical rollers of the horizontally oriented roller subassemblies.

The vertically oriented roller subassembly horizontally oriented rollers contacting and riding on the inner surface of each of the arcuate slot plates. The inner surface of each of the arcuate slot plates 111 being generally flat and configured to run along each of the horizontally oriented rollers of each of the vertically oriented arcuate roller subassemblies. The horizontally oriented rollers of the vertically oriented roller subassemblies keep the arcuate slot plate 111 engaged with the vertically oriented rollers of the horizontally oriented roller subassemblies.

There is a plurality of inner frame cross struts, being a forward inner frame cross strut 120, a mid-forward inner frame cross strut 122 and a middle inner frame cross strut 124 and a rearward inner frame cross strut 126. Each of the inner frame cross struts has a bottom surface, upper surface, a forward surface, a rearward surface, and a right end 128 and a left end 130, with a length there between. Each of the inner frame cross struts is a generally mirror image of each other. Each inner frame cross strut end is coupled to the inner surface of the inner frame outer rails.

The inner frame and the outer frame being movably coupled to the other.

There are a pair of inner frame seat mount rails 140, which couple with each inner frame inner rail, and are oriented generally perpendicular to the inner frame inner rails. Each of the seat mount rails having an inner surface.

Each of the inner frame seat mount rails having a upper surface, a lower surface, a forward surface, a rearward surface a right end 144, a left end 146 and a length there between.

There is an inner frame seat mount central hydraulic strut 148. The inner frame seat mount central hydraulic strut has an upper surface, a lower surface, a forward surface, a rearward surface, a right end 150, and a left end 152. The ends of the inner frame seat mount central hydraulic strut are coupled to each of the inner surface of each of the inner frame seat mount rails.

There is a hydraulic cylinder 160. The hydraulic cylinder 160 has a base 162 and a ram 164, with the ram being coupled to the inner frame 50.

The ram of the hydraulic cylinder 160 is coupled to the rearward cross member of the inner frame. The movement of the hydraulic cylinder 160 causes a movement of the seat mount of the inner frame.

The hydraulic cylinder base is coupled to the inner frame seat mount central hydraulic strut.

There are a pair of adjustable outer mount inertia balancing springs 170. The inertia balance springs couple the inner rearward cross member of the outer frame and the forward end of the inner frame. The balance springs are essential to balance the existing inertia in the simulator. Using the balancing springs, a motivating device, such as the hydraulic cylinder 160 needs only to overcome a small amount of inertia, whereas the spring contributes to the forward motion of the inner frame. This means that the necessary force to move the inner frame is reduced, allowing for smaller components to carry out the operation of the simulator.

There is a system control 180 for controlling a forward and a rearward movement of a seat 182, by moving the seat using the hydraulic cylinder 160 to provide such movement. The system control 180 is operatively coupled to a computer 184 having a program 186, hardware 188, and software 190, housed within the system control 180. The computer 184 controls a visual display on a computer screen 192. The computer 184 is electronically coupled to a user control means 194. The user control means 194 is at least one of the means from the group of control means which includes pedals, steering wheels 196, shifts, levers, buttons, switches, toggles, pulls, and joysticks, for providing a visual simulation with movement simulation.

There is a seat belt simulation subassembly 200. The seat belt simulation subassembly comprises an adjustable seat belt 202, a pivotable coupler 204, an actuator 206, a spring 208, an arcuate pulley 210, and a terminal attachment 212.

There is a user's seat which is coupled to the seat mount rails. The seat belt is coupled to a user's seat. The pivotable coupler allows the seat belt to be rotated. The spring provides a predetermined tension to the belt. The actuator is operatively coupled to the control so as to add to the simulation of braking and accelerating by the movement of the actuator, in addition to the spring tension of the seat belt, providing a change in the sensation of tension which would occur during braking or accelerating.

Referring to FIGS. 13-16, a yaw mechanism of the simulation device 10 is shown. As discussed, when friction between a vehicle's tires and the road surface decreases or excessive rotational force occurs that overcomes any such friction (due to turning too quickly), the vehicle rotates with respect to an axis of travel of the vehicle. It is important for a trainee to learn the feeling of such loss of control so as to correctly compensate by steering with the direction of travel to attempt to regain control. In prior simulation systems lacking yaw, the trainee receives no feedback regarding such rotational movement (yaw) and does not sense that control is being lost and, therefore, does not sense when control is improved or restored.

To provide this sense of rotation, a yaw mechanism is inserted between the payload (e.g., the cabin containing the trainee on a seat 182) and the inner frame 50. The yaw mechanism includes a yaw motor 310/310A that is anchored to the inner frame 50. In some embodiments, the yaw motor 310 has a shaft 312 that connects to a fitting 314, the fitting being fixed to a yaw platform 320 near one end of the yaw platform. In some embodiments, the yaw platform 320 is interfaced to the inner frame 50 by pivot 312 and a yaw hydraulic ram 310A moves the yaw platform 320 with respect to the inner frame 50. A distal end area of the yaw platform 320 interfaces to two or more bearings 324, providing for a slideable interface between the distal end area of the yaw platform 320 and the bearings 324 that are interfaced to the inner frame 50. In such, when the yaw motor 310 generates rotational force on the shaft 312, the yaw platform 320 that is initially on axis with the inner frame 50, rotates to become out of axis with respect to the inner frame 50, simulating loss of friction or overcoming of friction between the road surface and the vehicle wheels. Although the bearings 324 are shown as balls in sockets, a bottom surface of the yaw platform interfacing with the balls, any other slideable interface is anticipated such as having nylon bearings against a nylon surface or other slideable interface.

In FIG. 13, the yaw platform 320 is interfaced to the inner frame at a pivot 312A and bearings 324 (covered by the yaw platform 320) and a yaw hydraulic ram 310A interfaced between the inner frame 50 and the yaw platform 320 (hidden by the yaw platform 320).

In such, the yaw hydraulic ram 310A is operable to move the yaw platform 320 between positions denoted by 320A and 320B, simulating yaw as occurs when a vehicle loses control due to slick surfaces and/or excessive steering/braking.

In some embodiments, the fitting 314 is only a pivot interfaced to a yaw platform 320 near one end of the yaw platform. In such, the yaw motor 310A is a hydraulic ram that interfaces to the opposite end of the yaw platform 320, pushing and pulling that end of the yaw platform through an arm 313A that connects to the yaw platform 320 at an interface 314A.

Figure 17:
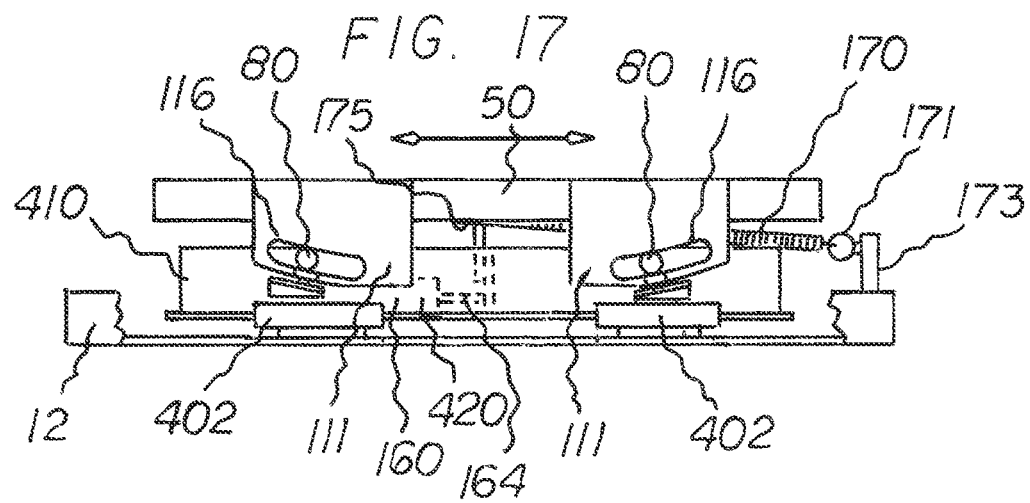
FIG. 17 is a side view of the simulation device having a slide mechanism.
Figure 18:
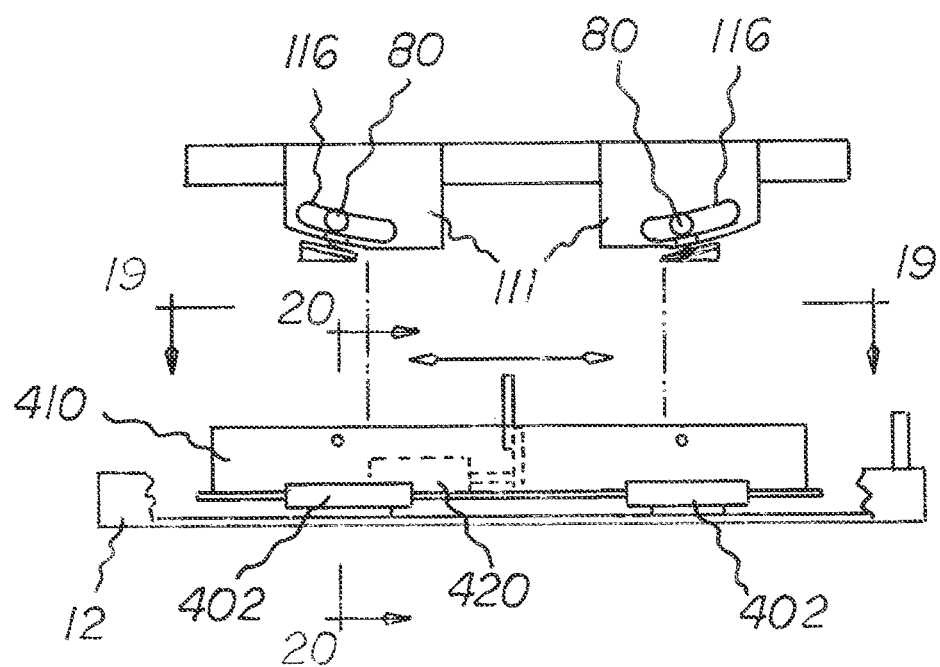
FIG. 18 is a side exploded view of the simulation device having a slide mechanism.
Figure 19:
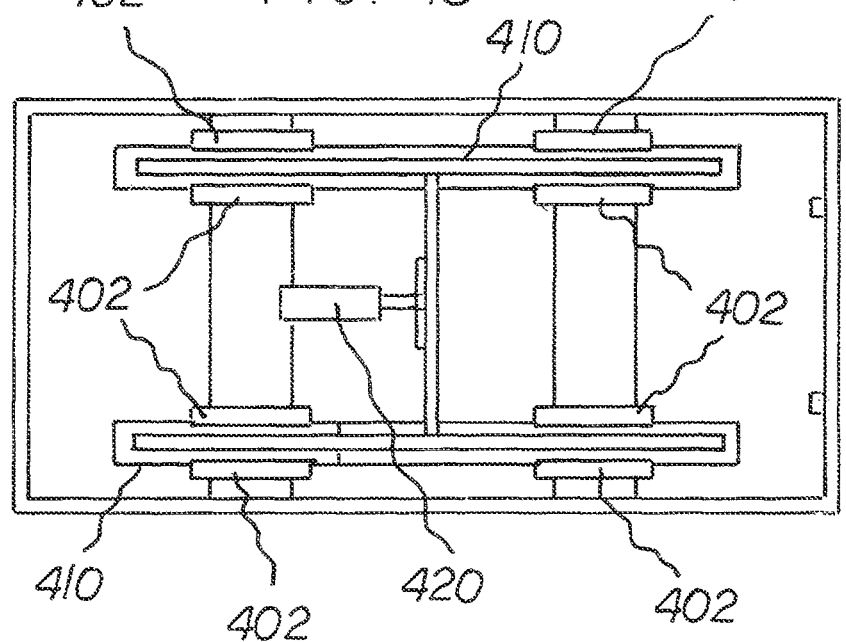
FIG. 19 is a bottom view taken along line 19-19 of FIG. 18 of the inner frame and outer frame of the simulation device having the slide mechanism.
Figure 20:
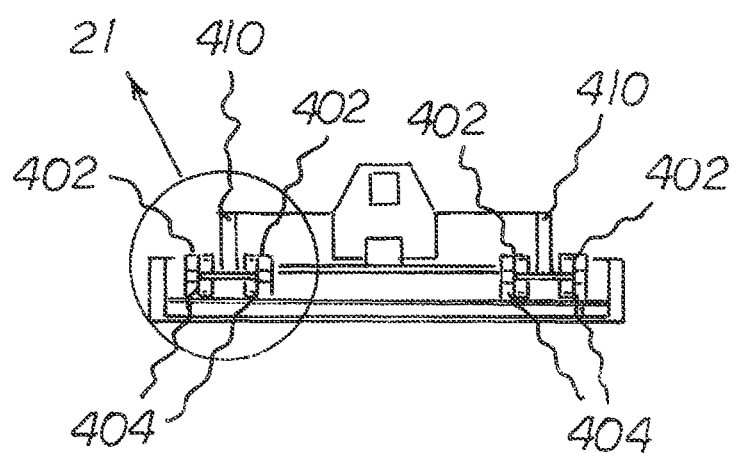
FIG. 20 is a front view of the simulation device having the slide mechanism.

In FIGS. 17 and 18, side views of the inner frame 50 coupled to the outer frame 12 is shown. In this, one end 175 of the balancing spring(s) 170 is/are affixed to the inner frame 50. The opposing end of the balancing spring(s) 170 is/are connected to an adjustment mechanism 171 and the adjustment mechanism 171 is anchored to the outer frame 12 at an attachment point 173. The adjustment mechanism 171 is any device that will change the tension of the spring 170, including a hand crank and a motorized adjustment mechanism. In some embodiments, a sensor is provided to measure the offset balance and the computer 184 reads the sensor and adjusts the adjustment mechanism 171 to balance the payload before starting a simulation.

As to the manner of usage and operation of the present invention, the same should be apparent from the above description. During a simulation, a trainee sits in the seat 182. In embodiments having a sensor to measure the offset balance, the computer 184 reads the sensor and adjusts the adjustment mechanism 171 to balance the payload including the trainee before starting a simulation. In embodiments with a manual adjustment mechanism 171, an operator must adjust the adjustment mechanism manually.

During running of simulation segments, when the simulation system decelerates (braking), the computer 184 operates the hydraulic cylinder 160 to pull the inner frame backwards (backwards as defined as behind the seat 182 in which the trainee sits) with respect to the outer frame and based upon the motion of the rollers 80 within the arcuate slots 116, the forward section of the payload tilts downward, as a vehicle would do when decelerating. Likewise, when the simulation system accelerates (gas), the computer 184 operates the hydraulic cylinder 160 to push the inner frame forwards (forwards as defined as behind the seat 182 in which the trainee sits) with respect to the outer frame and based upon the motion of the rollers 80 within the arcuate slots 116, the forward section of the payload tilts upward, as a vehicle would do when accelerating.

Now, if during a simulation, something occurs wherein there is a loss of control, for example, due to slippery roads (in the simulation) or operator error (e.g., turning too fast or braking too fast), the computer 184 instructs the yaw motor 310 to operate and rotate the yaw platform in the direction of the skid, providing a feeling of loss of control to the trainee.

Referring to FIGS. 17-22, view of the simulation device having a an optional slide mechanism are shown. For added realism in a simulator device, in some embodiments, the simulator device includes a slide mechanism similar to that shown in FIGS. 17-22. The slide mechanism provides for a greater length of travel than that provided by the rollers 80 within the arcuate slots 116 of the arcuate slot plates 111, as the distance of travel allowed by the rollers 80 within the arcuate slots 116 is limited to the length of the arcuate slots 116. For realism, it is often desired to provide the feeling of motion over a greater distance.

In the embodiment of FIGS. 17-22, this distance is provided by a set of roller assemblies 402 that slideably support the rails 410. In the embodiment shown, the roller assemblies 402 are interfaced to the outer frame 12 and the arcuate slot plates 111 interface to the rails 410. Thereby, the arcuate slot plates 111 (holding the inner frame 50 through the rollers 80 within the arcuate slots 116) slide horizontally along the rails 410 under control of a horizontal drive cylinder 420.

The roller assemblies 402 include a plurality of rollers 404 that support the rails 410. Any number of rollers 404 are anticipated, at least one roller 404 per roller assembly 402. In a preferred embodiment, the rollers 404 are ball bearings to reduce friction between the rails 410 and the roller assemblies 402, requiring less energy from the horizontal drive cylinder 420 to move the inner frame 12 in a horizontal direction.

Figure 23:
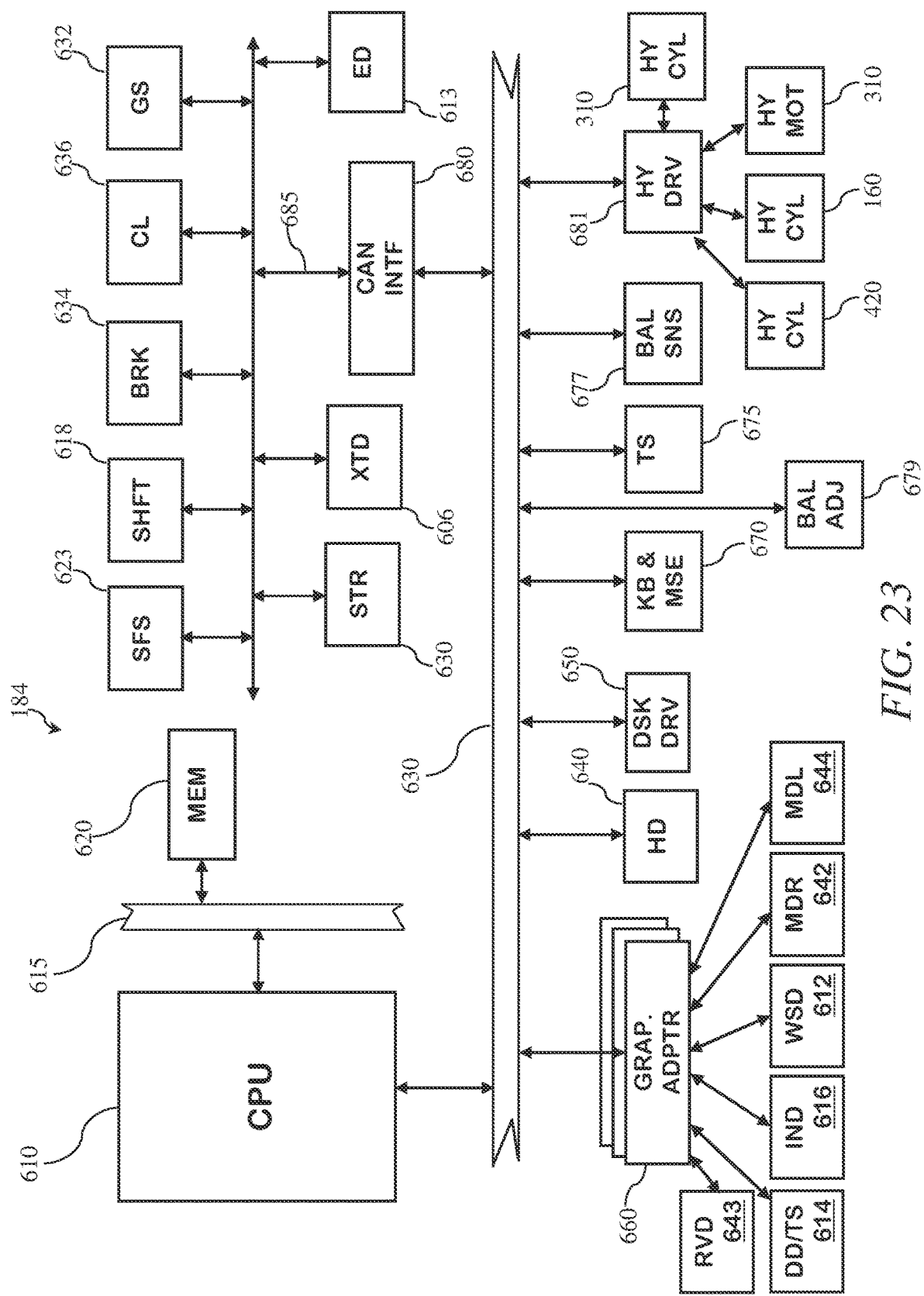
FIG. 23 is a schematic diagram of the control system of the simulation device.

Referring to FIG. 23, a schematic view of a computer 184 is shown. This computer 184 represents a typical computer system used as the heart of the simulation system 10. The example computer 184 is shown in its simplest form, having a single processor. Many different computer architectures are known that accomplish similar results in a similar fashion and the present invention is not limited in any way to any particular computer system. The present invention works well utilizing a single processor system, multiple processor system where multiple processors share resources such as memory and storage, a multiple server system where several independent servers operate in parallel (perhaps having shared access to the data or any combination). In this, a processor 610 is provided to execute stored programs that are generally stored for execution within a memory 620. The processor 610 can be any processor or a group of processors, for example an Intel Pentium-4® CPU or the like. The memory 620 is connected to the processor in a way known in the industry such as by a memory bus 615 and is any memory 620 suitable for use with the selected processor 610, such as SRAM, DRAM, SDRAM, RDRAM, DDR, DDR-2, flash, FEROM, etc.

Also connected to the processor 610 is a system bus 630 for connecting to peripheral subsystems such as a network interface (not shown), a persistent storage (e.g., a hard disk, semiconductor storage such as flash, a raid system, etc.) 640, a disk drive (e.g., DVD) 650, one or more graphics adapters 660, a keyboard/mouse 670 and/or one or more touch screen interfaces 675. The graphics adapter(s) 660 receives commands and display information from the system bus 630 and generates a display image that is displayed on one or more of the graphic display devices 612/614/616/642/643/644.

In general, the hard disk 640 may be used to store programs, executable code and data (e.g., courseware and user data) persistently. For data security and reliability, in some embodiments, the hard disk 640 is multiple disks or a raid system, etc. The removable disk drive 650 is often used to load CD/DVD/Blueray disks having programs, executable code and data onto the hard disk 640. These peripherals are examples of input/output devices, persistent storage and removable media storage. Other examples of persistent storage include core memory, FRAM, flash memory, etc. Other examples of removable disk drives 650 include CDRW, DVD, DVD writeable, Blueray, compact flash, other removable flash media, floppy disk, etc. In some embodiments, other devices are connected to the system through the system bus 630 or with other input-output connections. Examples of these devices include printers; graphics tablets; joysticks; audio components; and communications adapters such as modems and Ethernet adapters.

Although there are many ways anticipated for connecting training system components 613/632/634/636/606/618/623 to the processor, one preferred interface is a bi-directional local area network such as Car Area Network 685 (CAN) connected to the system bus 630 by a Car Area Network (CAN) interface 680 as known in the industry. Any connection scheme to the system components 613/632/634/636/ 606/618/623 is anticipated including direct wiring, any local area network (e.g., Ethernet, CAN or VAN) and wireless (e.g., Bluetooth).

In some embodiments, a keyboard and mouse 670 are provided. In some embodiments a touch screen is mounted to one or more of the display devices 612/614/616/642/643/ 644.

The hydraulic cylinder 160, horizontal drive cylinder 420, and yaw motor 310 or yaw cylinder 310A are controlled through a driver 681. In some embodiments, a balance sensor 677 detects when the system is balanced by the one or more balancing springs 170. In such, balance adjustment is made through a balance adjustment driver 679 that is interface to the balance adjustment mechanism 171.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A simulation device comprising:
    an outer frame, the outer frame for resting on a floor surface;
    an inner frame, the inner frame having an inner frame axis, and the inner frame being slideably interfaced to the outer frame by tilt bearings that traverse arcuate slots such that when the inner frame moves forward or backward with respect to the outer frame along the inner frame axis, the inner frame tilts with respect to the floor surface;
    a hydraulic cylinder interfaced between the outer frame and the inner frame, the hydraulic cylinder interfaced moves the inner frame forward or backward with respect to the outer frame;
    a yaw platform interfaced to the inner frame at one end at a pivot and at a distal opposing end by two or more bearings, the yaw platform having a yaw platform axis; and
    whereas operation of a yaw motor or a yaw hydraulic ram interfaced to the yaw platform causes the yaw platform to change an angle between the inner frame axis and the yaw platform axis.

2. The simulation device of claim 1, wherein the tilt bearings comprise rollers that travel through the arcuate slots.

3. The simulation device of claim 1, wherein as the hydraulic cylinder moves the inner frame forward in a first direction towards a front end of the inner frame, the front end of the inner frame raises with respect to the floor surface to simulate acceleration.

4. The simulation device of claim 3, wherein as the hydraulic cylinder moves the inner frame backward in a second direction towards a rear end of the inner frame, the front end of the inner frame lowers with respect to the floor surface to simulate braking.

5. The simulation device of claim 1, further comprising one or more balance springs, a first end of the one or more balance springs interfaced to the inner frame and a distal second end of the one or more balance springs interfaced to the outer frame, the one or more balance springs are adjustable to provide a balance of a payload that is supported by the yaw platform.

6. The simulation device of claim 5, wherein the one or more balance springs are adjusted by one or more motors.

7. The simulation device of claim 1, wherein the yaw motor is a hydraulic motor.

8. The simulation device of claim 1, wherein the two or more bearings comprise balls in sockets, the sockets are connected to an upper surface of the inner frame and a bottom surface of the yaw platform configured to slide across the balls.

9. A method of providing a simulation of yaw in a simulator comprising an outer frame resting on a floor surface, an inner frame having an inner frame axis and is slideably interfaced to the outer frame by tilt bearings that traverse arcuate slots, a hydraulic cylinder interfaced between the outer frame and the inner frame, and a payload interfaced to the inner frame at one end at a pivot and at a distal opposing end by two or more bearings, the payload having a yaw axis, the method comprising:
    moving a payload forward and backward along the inner frame axis to simulate acceleration and deceleration of the payload, thereby raising a front edge of the payload during the acceleration of the payload and lowering the front edge of the payload during the deceleration of the payload; and
    rotating the payload with respect to the axis of movement to simulate yaw.

10. The method of claim 9, wherein the moving of the payload forward along the inner frame axis results in increasing an altitude of the front edge of the payload, thereby simulating the acceleration of the payload.

11. The method of claim 9, wherein the moving of the payload backward along the inner frame axis results in decreasing an altitude of the front edge of the payload, thereby simulating the deceleration of the payload.

12. The method of claim 9, whereas the rotating of the payload with respect to the axis of movement is performed by rotating of a shaft of a motor connected to a front area of the payload, a rear area of the payload slideable over a surface.

13. A simulation device comprising:
    a outer frame, the outer frame for resting on a floor surface, the outer frame having two sets of symmetrical arcuate slots on opposing sides of the outer frame;
    an inner frame, the inner frame having two sets of bearings that traverse respective arcuate slots, the inner frame having an inner frame axis such that as the inner frame moves forward and backward with respect to the outer frame, the two sets of bearings traverse the respective arcuate slots;
    a hydraulic cylinder interfaced between the outer frame and the inner frame, extending of the hydraulic cylinder moves the inner frame in a first direction along the inner frame axis and retracting of the hydraulic cylinder moves the inner frame in a second, opposing direction along the inner frame axis;
    a yaw platform, a first end of the yaw platform is interfaced to the inner frame at one end at a pivot, a distal, opposing end of the yaw platform is slideably interfaced to the inner frame such that, the distal, opposing end of the yaw platform is slideable in an arc having a radius emanating from the pivot, the yaw platform having a yaw platform axis;
    a payload is connected to a top surface of the yaw platform, the payload comprising a seat; and
    whereas a yaw motor or a yaw hydraulic ram causes the yaw platform to move along the arc, thereby changes an angle between the inner frame axis and the yaw platform axis.

14. The simulation device of claim 13, wherein each bearing of the two sets of bearings is a roller that traverses the respective arcuate slots.

15. The simulation device of claim 13, wherein as the hydraulic cylinder moves the inner frame in the first direction along the inner frame axis towards a front end of the inner frame, the front end of the inner frame raises with respect to the floor surface.

16. The simulation device of claim 15, wherein as the hydraulic cylinder moves the inner frame in the second, opposing direction along the inner frame axis towards a rear end of the inner frame, the front end of the inner frame lowers with respect to the floor surface.

17. The simulation device of claim 13, further comprising one or more balance springs, a first end of each of the one or more balance springs interfaced to the inner frame and a distal second end of each of the one or more balance springs interfaced to the outer frame, the one or more balance springs are adjustable to provide a balance of the payload that is supported by the yaw platform.

18. The simulation device of claim 17, wherein the one or more balance springs are adjusted by one or more motors.

19. The simulation device of claim 13, wherein the yaw motor is a hydraulic motor.

20. The simulation device of claim 13, wherein the distal, opposing end of the yaw platform is slideably interfaced to the inner frame by two or more bearings comprise balls in sockets, the sockets are connected to an upper surface of the inner frame and a bottom surface of the yaw platform slides across the balls.

* * * * *